(12) United States Patent
Kim

(10) Patent No.: US 9,194,317 B2
(45) Date of Patent: Nov. 24, 2015

(54) GASOLINE ENGINE CONTROL SYSTEM AND CONTROL METHOD FOR THE SAME

(71) Applicants: Hyundai Motor Company, Seoul (KR); Kia Motors Corporation, Seoul (KR)

(72) Inventor: Seungbum Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 437 days.

(21) Appl. No.: 13/710,255

(22) Filed: Dec. 10, 2012

(65) Prior Publication Data
US 2014/0121942 A1    May 1, 2014

(30) Foreign Application Priority Data
Oct. 31, 2012   (KR) .................. 10-2012-0121874

(51) Int. Cl.
*F02M 7/00*   (2006.01)
*F02D 41/00*   (2006.01)
*F02D 41/06*   (2006.01)
*F02D 35/02*   (2006.01)
*F02D 41/14*   (2006.01)
(Continued)

(52) U.S. Cl.
CPC ........ *F02D 41/0097* (2013.01); *F02D 13/0261* (2013.01); *F02D 35/027* (2013.01); *F02D 41/0025* (2013.01); *F02D 41/064* (2013.01); *F02D 13/0249* (2013.01); *F02D 19/0636* (2013.01); *F02D 19/0649* (2013.01); *F02D 41/1498* (2013.01); *F02D 2013/0292* (2013.01); *Y02T 10/18* (2013.01); *Y02T 10/36* (2013.01)

(58) Field of Classification Search
CPC .......... F02D 41/0025; F02D 2041/001; F02D 41/064; F02D 19/081; F02D 35/027; F02D 19/061; F02D 13/0261; F02D 41/062; F02D 41/1498; F02D 2200/021; F02D 37/02; F02D 19/0615; F02D 19/0694; F02D 41/0097; F02D 3/0261; F02D 19/0649; F02D 2013/0292; F02D 13/0249; F02D 19/0636; Y02T 10/36; Y02T 10/18
USPC ................ 123/436, 1 A, 525–527, 575–578; 701/102–105
See application file for complete search history.

(56) References Cited

U.S. PATENT DOCUMENTS 4,389,986 A * 6/1983 Tanasawa ..................... 123/298
5,957,994 A * 9/1999 Meyer et al. .................. 701/110
(Continued)

*Primary Examiner* — Thomas Moulis
*Assistant Examiner* — Joseph Dallo
(74) *Attorney, Agent, or Firm* — Morgan, Lewis & Bockius LLP

(57) ABSTRACT

A gasoline engine control system includes a crankshaft rotation sensor configured to measure a rotation speed of a crankshaft, a coolant temperature sensor configured to measure a coolant temperature, an engine knocking sensor, a valve timing mechanism, an engine igniter, an air/fuel controller, and a controller configured to obtain a crankshaft rotation speed, a coolant temperature, and knocking information from the crankshaft rotation sensor, the coolant temperature sensor, and the engine knocking sensor, respectively, to determine a fuel class flowing in the engine and a cold start adaption factor, determine a fuel/cold start adaption factor based on the fuel class and the cold start adaption factor, and control an operation of at least one of the valve timing mechanism, the engine igniter, and the air/fuel controller according to the determined fuel/cold start adaption factor when the determined fuel/cold start adaption factor may be not a predetermined reference fuel/cold start adaption factor.

15 Claims, 6 Drawing Sheets

(51) Int. Cl.
*F02D 13/02* (2006.01)
*F02D 19/06* (2006.01)

(56) References Cited

U.S. PATENT DOCUMENTS

| | | | | |
|---|---|---|---|---|
| 6,283,102 | B1* | 9/2001 | Nelson et al. | 123/575 |
| 6,314,944 | B1* | 11/2001 | Majima | 123/491 |
| 6,390,065 | B2* | 5/2002 | Almkvist | 123/435 |
| 7,475,683 | B2* | 1/2009 | Kokubu | 123/672 |
| 8,113,174 | B2* | 2/2012 | Haft et al. | 123/436 |
| 2001/0027785 | A1* | 10/2001 | Almkvist | 123/675 |
| 2005/0263118 | A1* | 12/2005 | Nakai et al. | 123/90.15 |
| 2007/0119413 | A1* | 5/2007 | Lewis et al. | 123/295 |
| 2007/0119415 | A1* | 5/2007 | Lewis et al. | 123/295 |
| 2007/0255487 | A1* | 11/2007 | Etou et al. | 701/105 |
| 2009/0055079 | A1* | 2/2009 | Tanaka | 701/103 |
| 2009/0265086 | A1* | 10/2009 | Iihoshi et al. | 701/113 |
| 2010/0139591 | A1* | 6/2010 | Nakamura | 123/90.16 |
| 2010/0192905 | A1* | 8/2010 | Lewis et al. | 123/299 |
| 2010/0288226 | A1* | 11/2010 | Pfefferle | 123/295 |
| 2010/0294235 | A1* | 11/2010 | Lewis et al. | 123/299 |
| 2010/0319659 | A1* | 12/2010 | Sata et al. | 123/406.54 |
| 2010/0332104 | A1* | 12/2010 | Griese | 701/102 |
| 2011/0132340 | A1* | 6/2011 | Soltis | 123/703 |
| 2011/0174268 | A1* | 7/2011 | Surnilla et al. | 123/406.29 |
| 2011/0191005 | A1* | 8/2011 | Iwazaki et al. | 701/101 |
| 2011/0259298 | A1* | 10/2011 | Imamura et al. | 123/436 |
| 2011/0288746 | A1* | 11/2011 | Carr et al. | 701/103 |
| 2011/0307159 | A1* | 12/2011 | Nakasaka | 701/102 |
| 2012/0004828 | A1* | 1/2012 | Okazaki et al. | 701/103 |
| 2012/0029795 | A1* | 2/2012 | Surnilla et al. | 701/111 |
| 2012/0138017 | A1* | 6/2012 | Jentz et al. | 123/436 |
| 2012/0290191 | A1* | 11/2012 | Kobayashi | 701/102 |
| 2013/0030616 | A1* | 1/2013 | Syed et al. | 701/22 |

* cited by examiner

FIG. 3

|  | Fuel class | | | |
|---|---|---|---|---|
|  | 0 | 1 | 2 | 3 |
| ER mean value | 1.5 | 2 | 2.2 | 2.7 |

FIG. 4

| Classification | | Cold Start adaption factor | | | | | |
|---|---|---|---|---|---|---|---|
| | | 0.95 | 1 | 1.05 | 1.1 | 1.15 | 1.2 |
| Fuel Class | 0 | 0 | 0 | 0 | 0 | 0 | 0 |
| | 1 | 1 | 1 | 1 | 5 | 5 | 6 |
| | 2 | 1 | 2 | 2 | 6 | 6 | 10 |
| | 3 | 2 | 5 | 5 | 10 | 10 | 11 |

GASOLINE ENGINE CONTROL SYSTEM AND CONTROL METHOD FOR THE SAME

CROSS-REFERENCE TO RELATED APPLICATION

The present application claims priority to Korean Patent Application No. 10-2012-0121874 filed on Oct. 31, 2012, the entire contents of which is incorporated herein for all purposes by this reference.

BACKGROUND OF THE INVENTION

1. Field of the Invention

The present invention relates to a gasoline engine control system and a method of controlling the gasoline engine control system, and more particularly, to a gasoline engine control system capable of maintaining optimum performance of an engine by learning various qualities of fuel even though the various qualities of fuel are supplied to the engine, and a method of controlling the gasoline engine control system.

2. Description of Related Art

In a case of a currently mass-produced gasoline engine, many parts for control are changed according to an octane number of fuel.

For example, when fuel with a low octane number is used, there occurs a problem, such as knocking generation, output deterioration, exhaust gas generation, and engine hesitation generation.

In order to prevent the problem, a fuel sample is collected for each sale region/country, and a time of overlap between an intake valve and an exhaust valve, an engine ignition timing, air/fuel ratio control, and the like are individually determined based on a result of a fuel analysis.

Accordingly, since it is necessary to divide and input engine control ECU data according to a fuel characteristic for each sale region and/or country, there is a problem in that it is difficult to perform follow-up management and manage massive data.

Further, representative nature of the sample fuel is weak, so that a problem in durability/performance problem of the engine is eventually generated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a gasoline engine control system having advantages of maintaining optimum performance of an engine by learning various qualities of fuel even though the various qualities of fuel are supplied to the engine, and a method of controlling the gasoline engine control system.

In an aspect of the present invention, a gasoline engine control system of an engine, may include a crankshaft rotation sensor measuring a rotation speed of a crankshaft, a coolant temperature sensor measuring a coolant temperature, an engine knocking sensor, a valve timing mechanism, an engine igniter, an air/fuel controller, and a controller obtaining the rotation speed of the crankshaft, the coolant temperature, and knocking information from the crankshaft rotation sensor, the coolant temperature sensor, and the engine knocking sensor, respectively, wherein the controller determines a fuel class flowing in the engine and a cold start adaption factor, wherein the controller determines a fuel/cold start adaption factor based on the fuel class and the cold start adaption factor, and wherein the controller controls an operation of at least one of the valve timing mechanism, the engine igniter, and the air/fuel controller according to a determined fuel/cold start adaption factor when the determined fuel/cold start adaption factor is not a predetermined reference fuel/cold start adaption factor.

The cold start adaption factor is set based on the coolant temperature by the controller.

The fuel class is set according to a degree of change in the rotation speed by measuring the rotation speed of the crankshaft by the controller.

The fuel class is determined according to the degree of the change in the rotation speed of the crankshaft measured for a predetermined time by the controller when a cold start condition of the engine is met.

In a case where a determined fuel class is not a reference class and a retard value of an ignition timing of the engine controlled based on a knocking signal of the engine knocking sensor is not larger than a predetermined reference retard value, the controller determines the case as misfiring and outputs a malfunction signal.

In a case where the determined fuel class is not the reference class and the retard value of the ignition timing of the engine controlled based on the knocking signal of the engine knocking sensor is larger than the predetermined reference retard value, the controller controls an operation of the at least one of the valve timing mechanism, the engine igniter, and the air/fuel controller according to the determined fuel/cold start adaption factor.

The controller reduces overlap by controlling an operation of the valve timing mechanism according to the determined fuel/cold start adaption factor.

The controller retards the ignition timing of the engine by controlling an operation of the engine igniter according to the determined fuel/cold start adaption factor.

The controller enriches an air/fuel ratio by controlling an operation of the air/fuel controller according to the determined fuel/cold start adaption factor.

The controller retards the ignition timing of the engine by controlling an operation of the engine igniter according to the determined fuel/cold start adaption factor, and enriches an air/fuel ratio by controlling an operation of the air/fuel controller according to the determined fuel/cold start adaption factor.

In another aspect of the present invention, a method of controlling a gasoline engine control system comprising a crankshaft rotation sensor configured to measure a rotation speed of a crankshaft, a coolant temperature sensor configured to measure a coolant temperature, an engine knocking sensor, a valve timing mechanism, an engine igniter, an air/fuel controller, and a controller configured to obtain the rotation speed of the crankshaft, the coolant temperature, and knocking information from the crankshaft rotation sensor, the coolant temperature sensor, and the engine knocking sensor, respectively, to control an operation of at least one of the valve timing mechanism, the engine igniter, and the air/fuel controller, may include measuring a coolant temperature, setting a cold start adaption factor when a cold start condition of a vehicle is met, measuring change of a rotation speed of an engine for a predetermined time, setting a fuel class based on a measured change in the rotation speed of the engine, setting a fuel/cold start adaption factor based on the cold start adaption factor and the fuel class, and controlling an operation of the at least one of the valve timing mechanism, the engine igniter, and the air/fuel controller according to a determined fuel/cold start adaption factor when the determined fuel/cold start adaption factor is not a predetermined reference fuel/cold start adaption factor.

The method may further include determining an ignition timing retard value by detecting a knocking signal of the gasoline engine, and in a case where a determined ignition timing retard value is not larger than a predetermined reference retard value, determining the case as misfiring and outputting a malfunction signal.

The method may further include in a case where a determined fuel class is not a reference class and a retard value of an ignition timing of the engine controlled based on a knocking signal of the engine knocking sensor is larger than a predetermined reference retard value, controlling an operation of the at least one of the valve timing mechanism, the engine igniter, and the air/fuel controller according to the determined fuel/cold start adaption factor.

Overlap is reduced by controlling an operation of the valve timing mechanism according to the determined fuel/cold start adaption factor.

The ignition timing of the engine is retarded by controlling an operation of the engine igniter according to the determined fuel/cold start adaption factor.

An air/fuel ratio is enriched by controlling an operation of the air/fuel controller according to the determined fuel/cold start adaption factor.

An ignition timing of the engine is retarded by controlling an operation of the engine igniter according to the determined fuel/cold start adaption factor, and an air/fuel ratio is enriched by controlling an operation of the air/fuel controller according to the determined fuel/cold start adaption factor.

According to the gasoline engine control system and the method of controlling the gasoline engine control system according to the exemplary embodiment of the present invention, it is possible to maintain optimum performance of the engine by learning various qualities of fuel when the various qualities of fuel are supplied.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a fuel class applied to the gasoline engine control system according to the exemplary embodiment of the present invention.

FIG. 4 is a fuel/cold start adaption factor applied to the gasoline engine control system according to the exemplary embodiment of the present invention.

Figure 1:
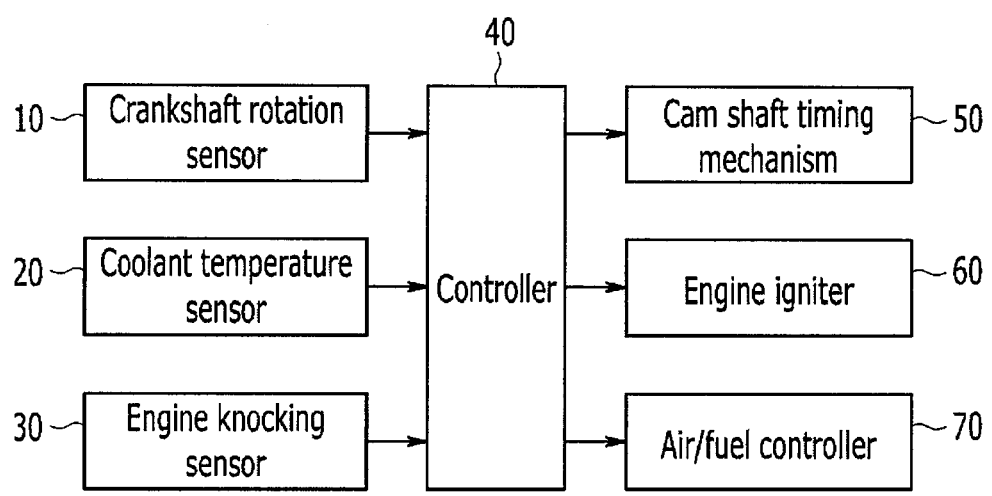
FIG. 1 is a block diagram of a gasoline engine control system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown.

However, as those skilled in the art would realize, the described embodiments may be modified in various different ways, all without departing from the spirit or scope of the present invention.

Further, throughout this specification, parts indicated by the same reference number mean the same constituent elements.

In the drawings, the thickness of layers, films, panels, regions, etc., are exaggerated for clarity.

It will be understood that when an element such as a layer, film, region, or substrate is referred to as being "on" another element, it can be directly on the other element or intervening elements may also be present.

In contrast, when an element is referred to as being "directly on" another element, there are no intervening elements present.

Throughout the specification, unless explicitly described to the contrary, the word "include" and variations such as "includes" or "including", will be understood to imply the inclusion of stated elements but not the exclusion of any other elements.

Hereinafter, an exemplary embodiment of the present invention will be described in detail with reference to the accompanying drawings.

FIG. 1 is a block diagram of a gasoline engine control system according to an exemplary embodiment of the present invention.

The gasoline engine control system according to the exemplary embodiment of the present invention includes a crankshaft rotation sensor 10 for measuring a rotation speed of a crankshaft, a coolant temperature sensor 20 for measuring a temperature of coolant, an engine knocking sensor 30 for measuring knocking of an engine, a valve timing mechanism 50 for adjusting an opening/closing timing of a valve, an engine igniter 60 included in the engine, an air/fuel controller 70 for controlling an air/fuel ratio of air flowing in the engine, and a controller 40.

The controller 40 obtains a crankshaft rotation speed, a coolant temperature, and knocking information from the crankshaft rotation sensor 10, the coolant temperature sensor 20, and the engine knocking sensor 30, respectively, to determine a fuel class flowing in the engine and a cold start adaption factor, determines a fuel/cold start adaption factor based on the fuel class and the cold start adaption factor, and controls an operation of at least one of the valve timing mechanism 50, the engine igniter 60, and the air/fuel controller 70 according to the determined fuel/cold start adaption factor when the determined fuel/cold start adaption factor is not a predetermined reference fuel/cold start adaption factor.

In general, fuel used in a gasoline engine has a different combustion characteristic according to an octane number of the fuel, and thus a rotation speed of a crankshaft for each cylinder of the engine may be changed.

The change in the rotation speed of the crankshaft may be roughness of the engine, and the roughness of the engine is called ER.

After the first start of the engine, change in a value of the ER is large, and the gasoline engine control system according to the exemplary embodiment of the present invention discriminates a quality of the fuel that is currently combusted in the engine based on the change of the ER value and appropriately controls the ignition timing, valve overlap, and an air/fuel ratio.

Figure 2:
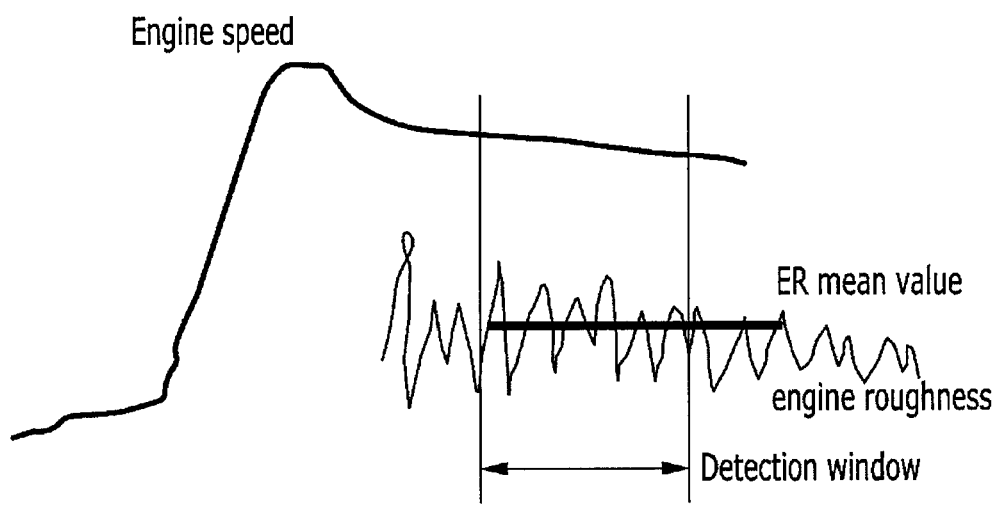
FIG. 2 is a graph illustrating change in a rotation speed of an engine and a rotation speed for each cylinder at an initial stage of starting.
Figure 3:
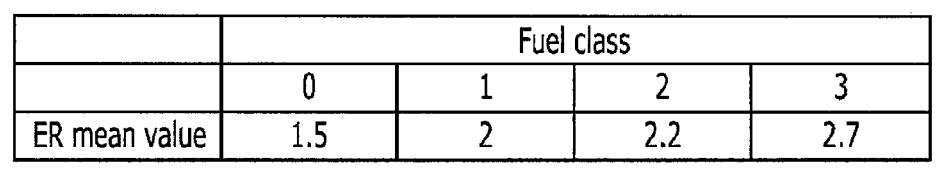

FIG. 2 is a graph illustrating change in a rotation speed of the engine and a rotation speed for each cylinder at an initial stage of starting, and FIG. 3 is a fuel class applied to the gasoline engine control system according to the exemplary embodiment of the present invention.

Referring to FIGS. 2 and 3, the gasoline engine control system according to the exemplary embodiment of the present invention measures change in a rotation speed for each cylinder by using the crankshaft rotation sensor 10 and estimates a mean value of the measured change as a combustion characteristic according to a quality of the fuel. That is, the mean value of the change of the rotation speed of each cylinder measured by the crankshaft rotation sensor 10 is served as an ER mean value, and digitizes the ER mean value as a fuel class, that is, a quality of fuel.

Here, the mean value of the change of the rotation speed for each cylinder may be measured for a predetermined time, for example, two to three seconds, from the first starting of the engine.

Here, the fuel class having a value of "0" is a reference class, means that a quality of currently used fuel is in a degree not requiring control by fuel, and is arbitrarily set considering a dimension of the engine, a market requiring condition, and the like. In this case, the ER mean value is a reference ER mean value, and has a reference value of, for example, 1.5.

A value of "1" of the fuel class means that the quality of the currently used fuel is in a degree requiring control by the fuel, and in this case, the ER mean value is "2" which means that the mean value of the change of the rotation speed for each cylinder is larger by 2/1.5, that is, approximately 33%, than the reference ER mean value in terms of the change in the rotation speed.

A value of "2" of the fuel class means that the quality of the currently used fuel requires control by the fuel, and in this case, the ER mean value is "2.2" which means that the mean value of the change of the rotation speed for each cylinder is larger by 2.2/1.5, that is, approximately 47%, than the reference ER mean value in terms of the change in the rotation speed.

A value of "3" of the fuel class means that the quality of the currently used fuel requires control by the fuel, and in this case, the ER mean value is "2.7" which means that the mean value of the change of the rotation speed for each cylinder is larger by 2.7/1.5, that is, approximately 80%, than the reference ER mean value in terms of the change in the rotation speed.

However, the respective fuel classes and the ER mean value correspond to one simple exemplary embodiment, the fuel class may be departmentalized into more numbers than the aforementioned numbers, and setting of the acceptable ER mean value and a ratio of the ER mean value to the change of the rotation speed may also be variously modified as a matter of course.

FIG. 4 is a fuel/cold start adaption factor applied to the gasoline engine control system according to the exemplary embodiment of the present invention.

In general, the tiny amount of fuel compared to a reference fuel amount is adapted based on the coolant temperature and the fuel is injected for combustion stability of the engine when a vehicle cold starts.

In this case, a factor used for the adaption of the fuel amount is referred to as a cold start adaption factor, and the cold start adaption factor will be applied to the gasoline engine control system according to the exemplary embodiment of the present invention.

The reason of using the cold start adaption factor is that the amount of injected fuel is changed by the cold start adaption factor when the vehicle cold starts, and the change of the amount of injected fuel exerts influence on the ER value, so that it is necessary to make a adaption according to the fuel amount.

Referring to FIG. 4, the controller 40 determines a fuel/cold start adaption factor by combining the fuel class determined by using the ER mean value and the cold start adaption factor determined according to the coolant temperature when the vehicle cold starts.

The controller 40 controls an operation of at least one of the valve timing mechanism 50, the engine igniter 60, and the air/fuel controller 70 according to the determined fuel/cold start adaption factor.

Figure 5:
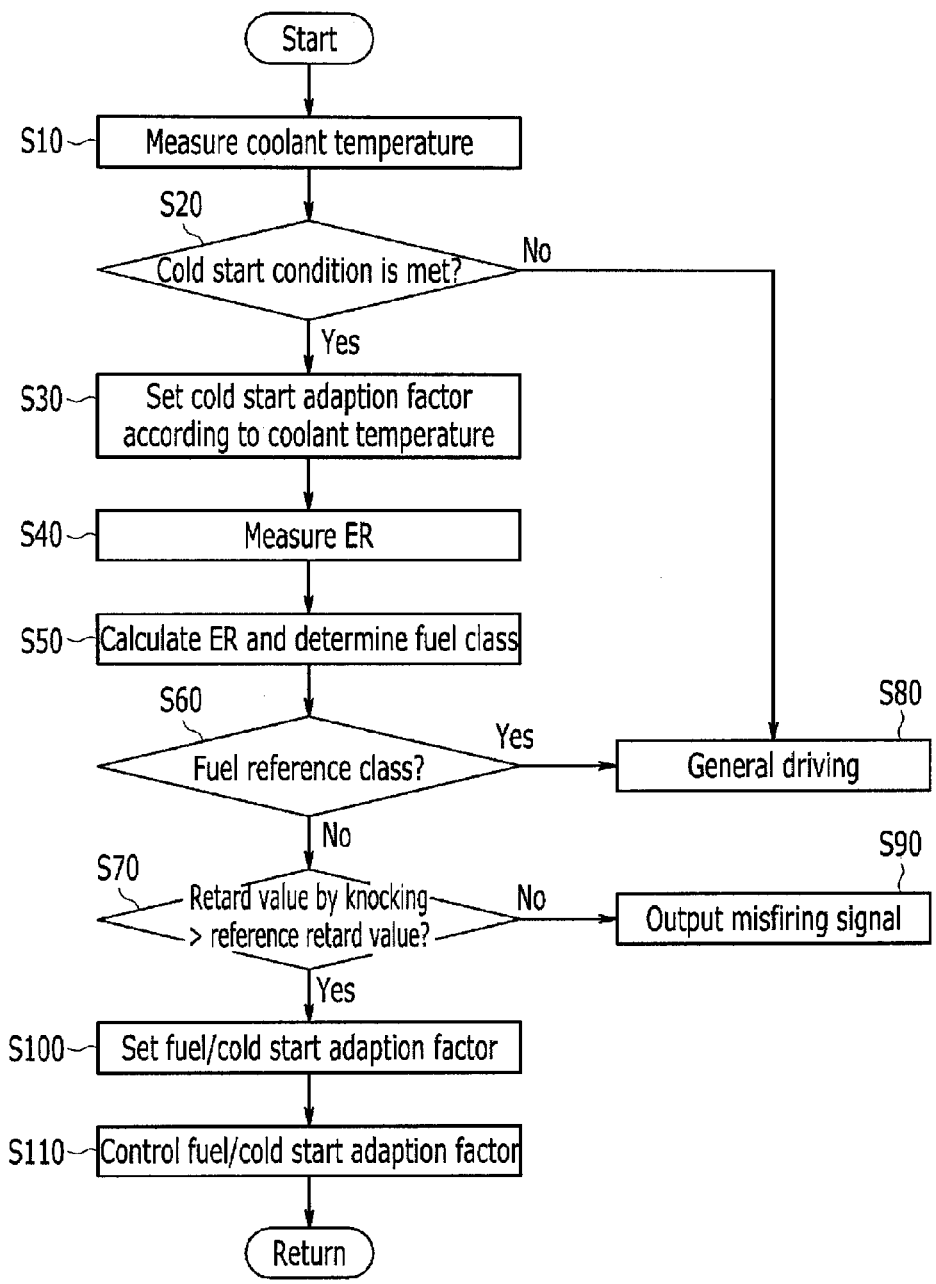
FIG. 5 is a flowchart illustrating a method of controlling a gasoline engine control system according to an exemplary embodiment of the present invention.

FIG. 5 is a flowchart illustrating a method of controlling a gasoline engine control system according to an exemplary embodiment of the present invention.

Hereinafter, the method of controlling the gasoline engine control system according to the exemplary embodiment of the present invention will be described with reference to FIGS. 1 to 5.

First, when the engine starts, the coolant temperature sensor 20 measures a coolant temperature (S10) and transmits a corresponding signal to the controller 40, and the controller 40 determines whether the coolant temperature meets a cold start condition (S20). For example, when the coolant temperature is equal to or lower than 0° C., the controller 40 determines that the coolant temperature meets the cold start condition.

When the measured coolant temperature does not meet the cold start condition, the controller 40 does not execute the method of controlling the gasoline engine control system according to the exemplary embodiment of the present invention and performs a general driving (S80).

When the measured coolant temperature meets the cold start condition, the controller 40 sets a cold start adaption factor according to the measured coolant temperature (S30).

The crankshaft rotation sensor 10 measures change in an engine rotation speed for a predetermined time (S40), and the controller 40 calculates an ER mean value based on the measured change of the engine rotation speed, and sets a fuel class based on the calculated ER mean value (S50).

The controller 40 determines whether the set fuel class is a reference class (S60), and when the set fuel class is the reference class, the controller 40 determines that it is not necessary to control a quality of the currently used fuel by the fuel and performs a general driving (S80).

When the set fuel class is not the reference class, the controller 40 detects a knocking signal of the gasoline engine to determine an ignition timing retard value, compares whether the retard value by the knocking is larger than a reference retard value (S70), and outputs a misfiring signal when the retard value by the knocking is not larger than the reference retard value (S90). Here, the retard value by the knocking means a value through which the controller 40 retard controls by using the knocking signal of the engine measured by the engine knocking sensor 30, and performs the retard control by distinct control from the method of controlling the gasoline engine control system according to the exemplary embodiment of the present invention. The retard value by the knocking is considered because when the retard value by the knocking is not larger than the predetermined reference retard value even though the predetermined fuel class is not the reference class, it may be predicted that the knocking is not generated by the fuel. In this case, the controller 40 determines this case as misfiring and outputs a corresponding signal. Here, the reference retard value may be 4 degrees.

The controller 40 sets a fuel/cold start adaption factor based on the cold start adaption factor and the fuel class (S100).

Further, the controller 40 controls an operation of at least one of the valve timing mechanism 50, the engine igniter 60, and the air/fuel controller 70 based on the set fuel/cold start adaption factor (S110).

Figure 6:
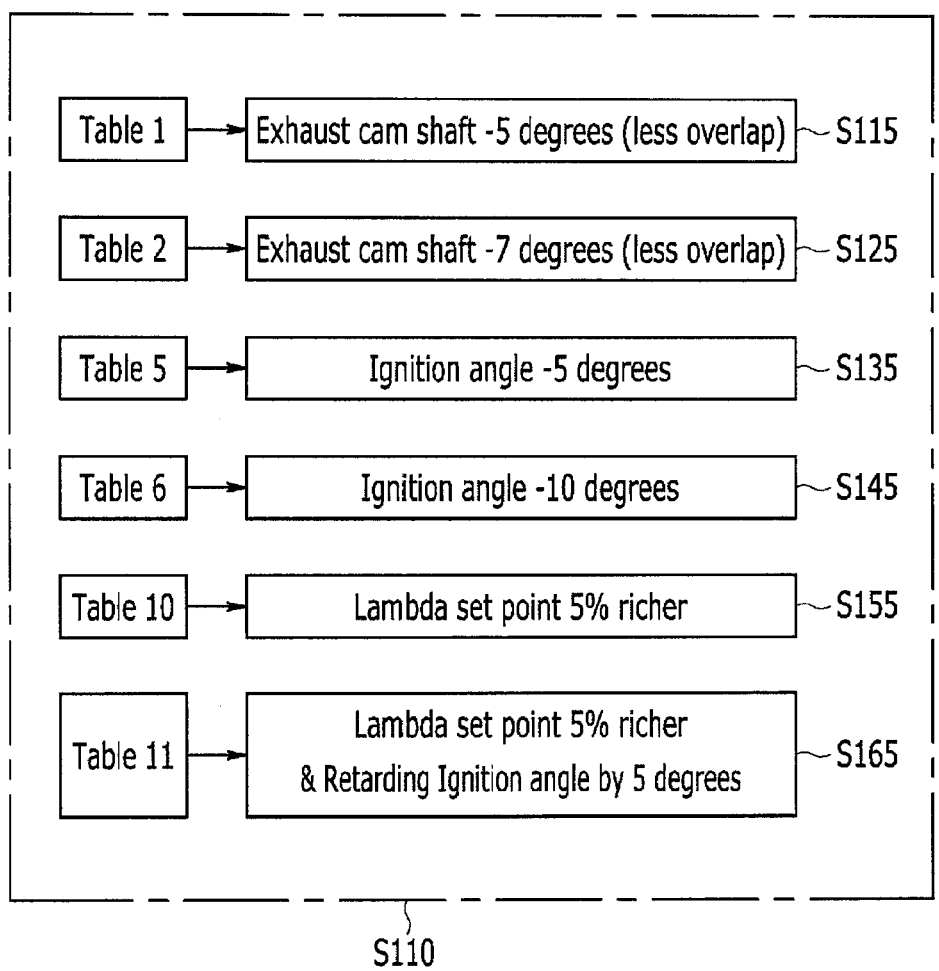
FIG. 6 is a block diagram illustrating a control method according to the fuel/cold start adaption factor applied to the method of controlling the gasoline engine control system according to an exemplary embodiment of the present invention.

FIG. 6 is a block diagram illustrating a control method according to the fuel/cold start adaption factor applied to the method of controlling the gasoline engine control system according to an exemplary embodiment of the present invention.

The cold start adaption factor, the fuel class, and the fuel/cold start adaption factor illustrated in FIGS. 4 and 6 are one example, and may be variously modified according to an engine dimension of the vehicle, a control limitation, and the like.

Hereinafter, the fuel/cold start adaption factor applied to the method of controlling the gasoline engine control system according to the exemplary embodiment of the present invention and the control method according to the fuel/cold start adaption factor will be described with reference to FIGS. 1 to 6.

In FIGS. 4 and 6, when a value of a fuel/cold start adaption factor table according to the cold start adaption factor and the fuel class is "1", the controller 40 decreases overlap by controlling the operation of the valve timing mechanism 50. For example, the controller 40 decreases valve overlap by retarding an exhaust cam shaft by −5 degrees (S115).

When a value of a fuel/cold start adaption factor table according to the cold start adaption factor and the fuel class is "2", the controller 40 decreases overlap by controlling the operation of the valve timing mechanism 50. For example, the controller 40 decreases valve overlap by retarding the exhaust cam shaft by −7 degrees (S125).

When a value of a fuel/cold start adaption factor table according to the cold start adaption factor and the fuel class is "5", the controller 40 retards the ignition timing of the engine by controlling the operation of the engine igniter 60. For example, the controller 40 retards an ignition angle by 5 degrees (S135).

When a value of a fuel/cold start adaption factor table according to the cold start adaption factor and the fuel class is "6", the controller 40 retards the ignition timing of the engine by controlling the operation of the engine igniter 60. For example, the controller 40 retards an ignition angle by 10 degrees (S145).

When a value of a fuel/cold start adaption factor table according to the cold start adaption factor and the fuel class is "10", the controller 40 enriches an air-fuel ratio by controlling the operation of the air/fuel controller 70. For example, the controller 40 enriches the air/fuel ratio to be richer by 5% than a current air/fuel ratio by controlling fuel and/or an inflow air amount (S155).

When a value of a fuel/cold start adaption factor table according to the cold start adaption factor and the fuel class is "10", the controller 40 retards the ignition timing of the engine by controlling the operation of the engine igniter 60, and enriches the air/fuel ratio by controlling the operation of the air/fuel controller 70. For example, the controller 40 enriches the air/fuel ratio to be richer by 5% than the current air/fuel ratio by controlling fuel and/or an inflow air amount and retards the ignition angle by 5 degrees (S165).

The fuel/cold start adaption factor illustrated in FIGS. 4 and 6 is one example, and an operation of the engine according to a quality of the fuel is controlled by controlling any one or two or more of the valve timing mechanism 50, the engine igniter 60, and the air/fuel controller 70.

As described above, the gasoline engine control system and the method of controlling the gasoline engine control system according to the exemplary embodiment of the present invention may maintain optimum performance of the engine by learning various qualities of fuel even though the various qualities of fuel are supplied to the engine.

Accordingly, it is possible to reduce efforts necessary for manage data of fuel samples for each region/country in which a vehicle is sold, thereby reducing manufacturing costs of a vehicle.

Further, even though various qualities of fuel are used in the same vehicle, the engine may exhibit optimum performance according to the quality of the fuel.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gasoline engine control system of an engine, comprising:
   a crankshaft rotation sensor measuring a rotation speed of a crankshaft;
   a coolant temperature sensor measuring a coolant temperature;
   an engine knocking sensor;
   a valve timing mechanism;
   an engine igniter;
   an air/fuel controller; and
   a controller obtaining the rotation speed of the crankshaft, the coolant temperature, and knocking information from the crankshaft rotation sensor, the coolant temperature sensor, and the engine knocking sensor, respectively, wherein the controller determines a fuel class flowing in the engine and a cold start adaption factor, wherein the controller determines a fuel/cold start adaption factor based on the fuel class and the cold start adaption factor, and wherein the controller controls an operation of at least one of the valve timing mechanism, the engine igniter, and the air/fuel controller according to a determined fuel/cold start adaption factor when the determined fuel/cold start adaption factor is not a predetermined reference fuel/cold start adaption factor, wherein in a case where a determined fuel class is not a reference class and a retard value of an ignition timing of the engine controlled based on a knocking signal of the engine knocking sensor is not larger than a predetermined reference retard value, the controller determines the case as misfiring and outputs a malfunction signal.

2. The gasoline engine control system of claim 1, wherein the cold start adaption factor is set based on the coolant temperature by the controller.

3. The gasoline engine control system of claim 2, wherein the fuel class is set according to a degree of change in the rotation speed by measuring the rotation speed of the crankshaft by the controller.

4. The gasoline engine control system of claim 3, wherein the fuel class is determined according to the degree of the change in the rotation speed of the crankshaft measured for a predetermined time by the controller when a cold start condition of the engine is met.

5. The gasoline engine control system of claim 1, wherein in a case where the determined fuel class is not the reference class and the retard value of the ignition timing of the engine controlled based on the knocking signal of the engine knocking sensor is larger than the predetermined reference retard value, the controller controls an operation of the at least one of the valve timing mechanism, the engine igniter, and the air/fuel controller according to the determined fuel/cold start adaption factor.

6. The gasoline engine control system of claim 5, wherein the controller reduces overlap by controlling an operation of the valve timing mechanism according to the determined fuel/cold start adaption factor.

7. The gasoline engine control system of claim 5, wherein the controller retards the ignition timing of the engine by controlling an operation of the engine igniter according to the determined fuel/cold start adaption factor.

8. The gasoline engine control system of claim 5, wherein the controller enriches an air/fuel ratio by controlling an operation of the air/fuel controller according to the determined fuel/cold start adaption factor.

9. The gasoline engine control system of claim 5, wherein the controller retards the ignition timing of the engine by controlling an operation of the engine igniter according to the determined fuel/cold start adaption factor, and enriches an air/fuel ratio by controlling an operation of the air/fuel controller according to the determined fuel/cold start adaption factor.

10. A method of controlling a gasoline engine control system comprising a crankshaft rotation sensor configured to measure a rotation speed of a crankshaft, a coolant temperature sensor configured to measure a coolant temperature; an engine knocking sensor; a valve timing mechanism; an engine igniter; an air/fuel controller; and a controller configured to obtain the rotation speed of the crankshaft, the coolant temperature, and knocking information from the crankshaft rotation sensor, the coolant temperature sensor, and the engine knocking sensor, respectively, to control an operation of at least one of the valve timing mechanism, the engine igniter, and the air/fuel controller, the method comprising:

measuring a coolant temperature;

setting a cold start adaption factor when a cold start condition of a vehicle is met;

measuring change of a rotation speed of an engine for a predetermined time;

setting a fuel class based on a measured change in the rotation speed of the engine;

setting a fuel/cold start adaption factor based on the cold start adaption factor and the fuel class;

controlling an operation of the at least one of the valve timing mechanism, the engine igniter, and the air/fuel controller according to a determined fuel/cold start adaption factor when the determined fuel/cold start adaption factor is not a predetermined reference fuel/cold start adaption factor; and determining an ignition timing retard value by detecting a knocking signal of the gasoline engine, and in a case where a determined ignition timing retard value is not larger than a predetermined reference retard value, determining the case as misfiring and outputting a malfunction signal.

11. A method of controlling a gasoline engine control system comprising:

a crankshaft rotation sensor configured to measure a rotation speed of a crankshaft, a coolant temperature sensor configured to measure a coolant temperature; an engine knocking sensor; a valve timing mechanism; an engine igniter; an air/fuel controller; and a controller configured to obtain the rotation speed of the crankshaft, the coolant temperature, and knocking information from the crankshaft rotation sensor, the coolant temperature sensor, and the engine knocking sensor, respectively, to control an operation of at least one of the valve timing mechanism, the engine igniter, and the air/fuel controller, the method comprising:

measuring a coolant temperature;

setting a cold start adaption factor when a cold start condition of a vehicle is met;

measuring change of a rotation speed of an engine for a predetermined time;

setting a fuel class based on a measured change in the rotation speed of the engine;

setting a fuel/cold start adaption factor based on the cold start adaption factor and the fuel class; and controlling an operation of the at least one of the valve timing mechanism, the engine igniter, and the air/fuel controller according to a determined fuel/cold start adaption factor when the determined fuel/cold start adaption factor is not a predetermined reference fuel/cold start adaption factor, in a case where a determined fuel class is not a reference class and a retard value of an ignition timing of the engine controlled based on a knocking signal of the engine knocking sensor is larger than a predetermined reference retard value, controlling an operation of the at least one of the valve timing mechanism, the engine igniter, and the air/fuel controller according to the determined fuel/cold start adaption factor.

12. The method of claim 10, wherein overlap is reduced by controlling an operation of the valve timing mechanism according to the determined fuel/cold start adaption factor.

13. The method of claim 10, wherein the ignition timing of the engine is retarded by controlling an operation of the engine igniter according to the determined fuel/cold start adaption factor.

14. The method of claim 10, wherein an air/fuel ratio is enriched by controlling an operation of the air/fuel controller according to the determined fuel/cold start adaption factor.

15. The method of claim 10, wherein an ignition timing of the engine is retarded by controlling an operation of the engine igniter according to the determined fuel/cold start adaption factor, and an air/fuel ratio is enriched by controlling an operation of the air/fuel controller according to the determined fuel/cold start adaption factor.

* * * * *